United States Patent [19]

Asai et al.

[11] Patent Number: 5,780,158
[45] Date of Patent: Jul. 14, 1998

[54] BIAXIALLY ORIENTED FILM TO BE LAMINATED ON A METAL

[75] Inventors: Takeo Asai; Takafumi Kudo; Koji Kubo; Yukihiko Minamihira; Kinji Hasegawa, all of Sagamihara, Japan

[73] Assignee: Teijin Limited, Osaka, Japan

[21] Appl. No.: 684,935

[22] Filed: Jul. 19, 1996

[51] Int. Cl.$^6$ .................... B32B 15/08; B32B 27/36; C08J 5/18
[52] U.S. Cl. .................... 428/412; 428/458; 428/480
[58] Field of Search .................... 428/412, 458, 428/480

[56] References Cited

FOREIGN PATENT DOCUMENTS

| 0434998 | 7/1991 | European Pat. Off. . |
| 0653455 | 5/1995 | European Pat. Off. . |
| 56-10451 | 2/1981 | Japan . |
| 1192545 | 8/1989 | Japan . |
| 1192546 | 8/1989 | Japan . |
| 2-57339 | 2/1990 | Japan . |
| 2055687 | 3/1981 | United Kingdom . |

Primary Examiner—Paul J. Thibodeau
Assistant Examiner—Holly C. Rickman
Attorney, Agent, or Firm—Sherman and Shalloway

[57] ABSTRACT

A biaxially oriented film to be laminated on a metal, which is a laminate film comprising (A) a first layer of a polyester comprising ethylene terephthalate as a main recurring unit; and (B) a second layer formed from a composition of a polycarbonate and polyesters, the polycarbonate and the polyesters being each contained in amounts of 20 to 50% by weight and 50 to 80% by weight based on the total thereof; the polyesters consisting essentially of a first polyester comprising ethylene terephthalate as a main recurring unit and having a terminal carboxyl group concentration of more than 5 eq./$10^6$ g and a second polyester comprising butylene terephthalate as a main recurring unit and having a terminal carboxyl group concentration of less than 20 eq./$10^6$ g; and the first and second polyesters being each contained in an amount of 10 to 90% by weight based on the total thereof; and in which (C) the plane orientation coefficients of the first layer and second layer are both in the range of 0.05 to 0.10.

20 Claims, No Drawings

BIAXIALLY ORIENTED FILM TO BE LAMINATED ON A METAL

DETAILED DESCRIPTION OF THE INVENTION

This invention relates to a biaxially oriented film to be laminated on a metal. More specifically, it relates to a biaxially oriented film to be laminated on a metal, which exhibits excellent moldability when it is laminated on a metal plate and subjected to can making processing such as drawing, which is excellent in adhesion to a metal plate, odor retaining property (flavor retaining property) and impact resistance at low temperatures, which has good film forming properties (such as extrusion moldability and drawability), and which is suitable for use in metal cans such as beverage cans and food cans.

Heretofore, metal cans have been coated to prevent corrosion in both inner and outer surfaces thereof. In recent years, a process for obtaining rust proof property without using an organic solvent has been developed for the purpose of simplifying production process, improving hygienic aspect, eliminating pollution and the like, and a method for making cans by laminating a thermoplastic resin film on a metal plate made from tin-plated steel plate, tin-free steel plate, aluminum plate or the like and drawing the resulting laminate has been widely used. As the thermoplastic resin film, a polyester film is generally used.

Japanese Laid-Open Patent Publication No. 56-10451 and Japanese Laid-Open Patent Publication No. 1-192546 disclose that a biaxially oriented polyethylene terephthalate film is laminated on a metal plate via an adhesive layer of a low-melting polyester and the laminated metal plate is used as a can-making material. Although the biaxially oriented polyethylene terephthalate film has excellent heat resistance and odor or flavor retaining property, its moldability is insufficient. Therefore, blanching (generation of fine cracks) or rupture of the film may occur in the course of can-making fabrication which inevitably invites large deformation.

Japanese Laid-Open Patent Publication No. 1-192545 and Japanese Laid-Open Patent Publication No. 2-57339 disclose that an amorphous or extremely low-crystalline aromatic polyester film is laminated on a metal plate and the laminated metal plate is used as a can-making material.

Although the amorphous or extremely low-crystalline aromatic polyester film is superior in moldability, it is inferior in odor or flavor retaining property. Furthermore, it is liable to embrittle by post-treatment such as printing after can-making fabrication, retort sterilization and a prolonged time of storage, and may deteriorate to a film which is readily cracked by external impact.

EP-A-0653455 A1 discloses a multilayer film to be laminated on a metal, which is formed of (A1) a first layer of a polyester resin having a melting point of more than 200° C., and (A2) a second layer of a polycarbonate resin or a resin composition comprising a polyester resin having a melting point of more than 200° C. and a polycarbonate, the amount of the polycarbonate resin contained in the resin composition being at least 1% by weight based on the total weight of the polyester resin and the polycarbonate resin; which exhibits only a current value of 0.1 mA or less when it is laminated on a steel plate, impact is given on the resulting laminate, and electricity is applied to the laminate (impact resistance test); and which has a total thickness in the range of 5 to 100 μm.

However, EP-A-0653 455 A1 has no idea of using a combination of two different polyesters in the resin composition of the second layer.

An object of the present invention is to provide a novel multilayer film to be laminated on a metal plate.

Another object of the present invention is to provide a multilayer film to be laminated on a metal plate, which is not colored or does not contain any bubbles, and which exhibits excellent moldability that it is free from "melt swing" during extrusion molding and rupture during drawing.

A further object of the present invention is to provide a multilayer film to be laminated on a metal plate, which is excellent in impact resistance especially at low temperatures, adhesion to a metal plate and odor or flavor retaining property (hereinafter to be simply referred to as flavor retaining property) as well as film forming properties such as extrusion moldability and drawability.

Other objects and advantages of the present invention will become apparent from the following description.

According to the present invention, the above objects and advantages of the present invention can be attained by a biaxially oriented film to be laminated on a metal, which is a laminate film comprising:

(A) a first layer of a polyester comprising ethylene terephthalate as a main recurring unit; and (B) a second layer formed from a combination of polyesters and a polycarbonate which consists essentially of a recurring unit represented by the following formula (1):

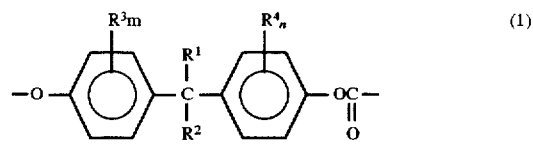

wherein $R^1$ and $R^2$ are independent from each other and selected from the group consisting of a hydrogen atom, alkyl group having 1 to 5 carbon atoms and cycloalkyl group having 5 to 6 ring carbon atoms, or $R^1$ and $R^2$ may be bonded together to form a cycloalkylene group having 5 to 6 ring carbon atoms with a carbon atom bonded thereto, $R^3$ and $R^4$ are independent from each other and selected from the group consisting of an alkyl group having 1 to 5 carbon atoms, phenyl group and halogen atom, and m and n are independent from each other and 0, 1 or 2, the polycarbonate and the polyesters being contained in amounts of 20 to 50% by weight and 50 to 80% by weight based on the total thereof, respectively; the polyesters consisting essentially of a first polyester comprising ethylene terephthalate as a main recurring unit and having a terminal carboxyl group concentration of more than 5 eq./$10^6$ g and a second polyester comprising butylene terephthalate as a main recurring unit and having a terminal carboxyl group concentration of less than 20 eq./$10^6$ g; and the first and second polyesters being each contained in an amount of 10 to 90% by weight based on the total thereof; and in which (C) the plane orientation coefficients of the first layer and second layer are in the range of 0.05 to 0.10.

The biaxially oriented film of the present invention, as described above, comprises two layers. The first layer is formed from a polyester comprising ethylene terephthalate as a main recurring unit. The polyester contains ethylene terephthalate in an amount of at least 50 mol %, preferably at least 80 mol %, more preferably at least 85 mol %, further preferably at least 90 mol %, particularly preferably at least 95 mol % of the whole recurring unit. In the present invention, a polyester which contains ethylene terephthalate in an amount of 80 to 100 mol % of the whole recurring unit is easily available and advantageously used.

A dicarboxylic acid component copolymerizable with such a polyester is selected, for example, from aromatic dicarboxylic acids such as isophthalic acid, phthalic acid and 2,6- or 2,7-naphthalenedicarboxylic acid; aliphatic dicarboxylic acids such as adipic acid, azelaic acid, sebacic acid and decanedicarboxylic acid; and alicyclic dicarboxylic acids such as 1,4-cyclohexanedicarboxylic acid. A glycol component to be copolymerized with the polyester is selected, for example, from aliphatic diols such as diethylene glycol, butane diol and hexane diol; and alicyclic diols such as 1,4-cyclohexane dimethanol. They may be used alone or in combination of two or more.

These polyesters preferably have a melting point of 200° C. or higher, more preferably 210° C. or higher. When a polyester having a low melting point is used, undesirably, a film having insufficient heat resistance and impact resistance is obtained.

The above polyesters preferably have an intrinsic viscosity, measured at 35° C. in orthochlorophenol, of 0.5 to 0.9, particularly preferably 0.6 to 0.8.

These polyesters may be produced by a conventionally known melt-polymerization method. As a catalyst used in the production of a polyester, a germanium (Ge) compound catalyst or a titanium (Ti) compound catalyst is preferably used. A solid-phase polymerization method is preferred as a polymerization method from a view point of a reduced content of an oligomer. Particularly when a polycarbonate is mixed and molten, use of a polyester polymerized in the presence of an antimony (Sb) compound catalyst promotes a decarboxylation reaction with the result that a carbon dioxide gas generates to form bubbles. Therefore, it is recommended not to use an Sb compound catalyst.

The second layer constituting the biaxially oriented film of the present invention comprises a polycarbonate and polyesters.

The polycarbonate consists essentially of the recurring unit represented by the above formula (1). In the above formula (1), $R^1$ and $R^2$ are each selected from the group consisting of a hydrogen atom, alkyl group having 1 to 5 carbon atoms and cycloalkyl group having 5 to 6 ring carbon atoms, or $R^1$ and $R^2$ may form a cycloalkylene group having 5 to 6 ring carbon atoms with a carbon atom bonded thereto.

$R^3$ and $R^4$ are each selected from the group consisting of an alkyl group having 1 to 5 carbon atoms, phenyl group and halogen atom. m and n are each 0, 1 or 2.

The alkyl group having 1 to 5 carbon atoms represented by $R^1$ and $R^2$ may be either straight-chain or branched-chain, as exemplified by ethyl, n-propyl, isopropyl, n-butyl, isobutyl, pentyl and the like.

Examples of the cycloalkyl group having 5 to 6 ring carbon atoms include cyclopentyl and cyclohexyl.

Illustrative examples of the alkyl group having 1 to 5 carbon atoms represented by $R^3$ and $R^4$ are the same as above. The halogen atom is selected from fluorine, chlorine, bromine and the like.

The recurring unit represented by the above formula (1) is preferably bisphenol A carbonate unit in which $R^1$ and $R^2$ are methyl and m and n are 0.

The polycarbonate used in the present invention may consist of recurring units of the same type represented by the above formula (1) or recurring units of at least two different types represented by the above formula (1).

The polycarbonate is generally produced through a reaction between a corresponding dihydric phenol and a carbonate precursor such as phosgene in a solvent such as methylene chloride in the presence of a known acid receptor or molecular weight modifier (interfacial polymerization method) or through an ester exchange reaction between a corresponding dihydric phenol and a carbonate precursor such as diphenyl carbonate (melt polymerization method).

The polycarbonate used in the present invention may be produced, for example, by the following methods:

(1) a method in which a dihydric phenol is excessively reacted with a carbonate precursor in the interfacial polymerization method;

(2) a method in which endcapping is carried out in the interfacial polymerization method;

(3) a method in which the proportion of a dihydric phenol and a carbonate precursor is adjusted in the interfacial polymerization method;

(4) a method in which a polyhydroxy compound is added in the latter stage of a polymerization reaction in the melt polymerization method; and (5) a method in which a polycarbonate having a terminal OH group amount of less than 20 moles/$10^6$ g and an appropriate amount of a dihydric phenol are molten and mixed and a catalyst is added as required to allow the polycarbonate and the dihydric phenol to react each other thereby to increase the amount of the terminal OH group.

The polycarbonate preferably has a viscosity-average molecular weight of 10,000 to 40,000, more preferably 10,000 to 35,000.

The polyesters constituting the second layer consist essentially of a first polyester comprising ethylene terephthalate as a main recurring unit and having a terminal carboxyl group concentration of more than 5 eq./$10^6$ g and a second polyester comprising butylene terephthalate as a main recurring unit and having a terminal carboxyl group concentration of less than 20 eq./$10^6$ g.

The first polyester needs to have a terminal carboxyl group concentration of more than 5 eq./$10^6$ g. If the terminal carboxyl group concentration is 5 eq./$10^6$ g or less, dispersion of the polycarbonate in the polyester will be inferior, and a film will be difficult to be drawn or will not be able to be drawn in an extreme case.

The terminal carboxyl group concentration is preferably 7 eq./$10^6$ g or more, more preferably 12 eq./$10^6$ g or more, particularly preferably 15 eq./$10^6$ g. The terminal carboxyl group concentration is preferably 20 eq./$10^6$ g or less.

As the first polyester comprising ethylene terephthalate as a main recurring unit, the above examples of the polyester for the first layer can be used. Therefore, it should be understood that the description for the polyester of the first layer can be applied directly to that omitted here.

Preferably, the first polyester contains ethylene terephthalate in an amount of 80 to 100 mol % of the whole recurring unit.

Meanwhile, the second polyester is a polyester containing butylene terephthalate in an amount of at least 50 mol % of the whole recurring unit. The second polyester preferably contains butylene terephthalate in an amount of at least 80 mol %, more preferably at least 85 mol %, further preferably at least 90 mol %, particularly preferably at least 95 mol % of the whole recurring unit.

Illustrative examples of a dicarboxylic acid component as a third component to be copolymerized with the second polyester include aromatic dicarboxylic acids such as isophthalic acid, phthalic acid and 2,6- or 2,7-naphthalenedicarboxylic acid; aliphatic dicarboxylic acids such as adipic acid, azelaic acid, sebacic acid and decanedicarboxylic acid; and alicyclic dicarboxylic acids such as 1,4-cyclohexanedicarboxylic acid. Illustrative examples of a glycol component as another third component to be copolymerized with the second polyester include aliphatic diols such as diethylene glycol, butane diol and hexane diol; and alicyclic diols such as 1,4-cyclohexane dimethanol. They may be used alone or in combination of two or more.

The second polyester needs to have a terminal carboxyl group concentration of less than 20 eq./$10^6$ g, preferably less than 17 eq./$10^6$ g or less, more preferably 5 to 17 eq./$10^6$ g, particularly preferably 5 to 15 eq./$10^6$ g.

The second polyester comprising butylene terephthalate as a main recurring unit serves to enhance the dispersibility of the polycarbonate in the polyester phase, suppress "melt swing" during extrusion molding and rupture during drawing, and improve film forming properties. If the terminal carboxyl group concentration of this polyester is higher than 20 eq./$10^6$ g, the effect of improving the dispersibility of the polycarbonate and film forming properties will not be exhibited.

The second polyester preferably has a melting point of more than 200° C., more preferably 210° C. When a polyester having a low melting point is used as the second polyester, disadvantageously, a film having insufficient heat resistance and impact resistance is obtained.

The second polyester preferably has an intrinsic viscosity, measured at 35° C. in orthochlorophenol, of 0.6 to 1.6, particularly preferably 0.7 to 1.5.

Like the above-described polyester comprising ethylene terephthalate as a main recurring unit, the second polyester is also preferably produced by a solid-phase polymerization method using a Ge compound catalyst or a Ti compound catalyst. Preferred examples of the Ge compound include (1) amorphous germanium oxide (2) microcrystalline germanium oxide, (3) a solution of germanium oxide dissolved in glycol in the presence of an alkali metal, alkali earth metal or a compound thereof, and (4) an aqueous solution of germanium oxide. Preferred examples of the Ti compound include titanium tetrabutoxide, titanium acetate and the like.

The polycarbonate and the polyesters constituting the second layer are contained in amounts of 20 to 50% by weight and 50 to 80% by weight based on the total thereof, respectively. If the proportion of the polycarbonate is more than 50% by weight, "melt swing" during extrusion molding and rupture during drawing will occur frequently and film forming properties will deteriorate. If the proportion of the polycarbonate is less than 20% by weight, impact resistance at low temperatures will not be improved.

The polyesters contains the first polyester and the second polyester both in an amount of 10 to 90% by weight based on the total of the first polyester and the second polyester.

If the proportion of the second polyester exceeds 90% by weight or the proportion of the first polyester is less than 10% by weight, the resulting film will be colored, and a carbon dioxide gas will be produced by decarboxylation through a reaction with the polycarbonate, and bubbles will be contained, making difficult film formation. On the contrary, if the proportion of the second polyester is less than 10% by weight or the proportion of the first polyester is more than 90% by weight, it is impossible to improve the dispersibility of the polycarbonate in the polyester phase and to achieve the effect of suppressing "melt swing" during extrusion molding and rupture during drawing.

The blending ratio (% by weight) of the first polyester to the second polyester is preferably 20-85/80-15, more preferably 40-80/60-20.

The polycarbonate contained in the second layer has a terminal hydroxyl group. Since this terminal hydroxyl group contributes to adhesion of the second layer (B) to a metal plate when the second layer (B) is to be bonded to the metal plate, the total concentration of the terminal hydroxyl groups of the polycarbonate and the polyester in the second layer is preferably at least 25 eq./$10^6$ g, more preferably at least 30 eq./$10^6$ g, the most preferably 40 to 200 eq./$10^6$ g.

The second layer, as described above, is formed from a composition comprising a polycarbonate and polyesters. Preferably, the composition contains a phosphorus compound. The phosphorus compound suppresses a reaction between a polycarbonate and a polyester, thereby preventing the coloration of the resulting film and the production of a carbon dioxide gas caused by decarboxylation. However, if the content of the phosphorus compound is too large, the effect of improving the dispersibility of the polycarbonate provided by the second polyester is impaired and film forming properties are liable to deteriorate. Therefore, the content of the phosphorus compound is preferably 20 to 100 ppm, more preferably 40 to 100 ppm and the most preferably 40 to 50 ppm.

The phosphorus compound may be either inorganic or organic, as exemplified by phosphorous acid, phosphoric acid, pyrophosphoric acid, metaphosphoric acid, salts thereof, di- and tri-alkyl phosphine, di- and tri-aryl phosphine, mono- and di-alkyl phosphinic acid, mono- and di-aryl phosphinic acid, phosphorous ester, phosphoric ester, polyphosphoric acid and the like, out of which, phosphorous acid, phosphoric acid, phosphorous ester and phosphoric ester are preferred. Examples of the ester include esters of lower alkyls (such as methyl and ethyl), phenyl esters, esters of glycols (such as ethylene glycol) and the like.

The phosphorus compound may be contained during the production of a polyester and/or a polycarbonate or may be added to the composition during melt extrusion.

The composition comprising the polycarbonate and the polyester for the second layer has a sea/island structure that the polycarbonate is dispersed as islands (dispersed phase) in the polyester as the sea (continuous phase). The polycarbonate islands are observed as particles having an average major diameter of 0.1 to 20 μm on a cut surface obtained by cutting a biaxially oriented film in the thickness direction and in parallel to the transverse direction. When the particles having such an average major diameter are dispersed as an independent phase (island), the frequent occurrence of troubles such as "melt swing" during extrusion molding and rupture during drawing can be suppressed and a biaxially oriented film having excellent impact resistance can be obtained.

On the cut surface as described above, the polycarbonate island preferably has a size of 0.1 to 10 μm, more preferably 0.1 to 5 μm.

In the polyester constituting the first layer and the composition comprising the polycarbonate and the polyester constituting the second layer of the biaxially oriented film of the present invention, an additive such as an antioxidant, heat stabilizer, ultraviolet light absorber, plasticizer, inorganic particle, organic particle, antistatic agent or the like may be dispersed or blended as required.

The biaxially oriented film of the present invention has a center line average surface roughness (Ra) of at least the first layer preferably in the range of 5 to 150 nm, more preferably 10 to 60 nm. When the Ra is in the above range, the manipulation ease of the film can be obtained.

To adjust the surface roughness (Ra) of the biaxially oriented film to the range of 5 to 150 nm, a lubricant is added to the polyester forming the first layer and/or to the composition comprising a polycarbonate and polyesters for forming the second layer, or a polycarbonate phase and a polyester phase are appropriately phase-separated.

The lubricant to be added is either inorganic or organic, while an inorganic lubricant is preferred. Examples of the inorganic lubricant include silica, alumina, titanium dioxide, calcium carbonate, barium sulfate and the like. Examples of the organic lubricant include crosslinked polystyrene particle, crosslinked silicone resin particle and the like. The lubricant preferably has an average particle diameter of 2.5 µm or less, preferably 0.01 to 2.0 µm. When the average diameter of the lubricant is more than 2.5 µm, pinholes may be formed with a coarse lubricant particle (of 10 µm or more, for example) at a portion deformed by molding serving as a starting point or rupture occurs as the case may be.

A lubricant which is particularly preferred from a view point of pinhole resistance is a monodisperse lubricant having an average particle diameter of 2.5 µm or less and a particle diameter ratio (major diameter/minor diameter) of 1.0 to 1.2, as exemplified by spherical silica, spherical titanium dioxide, spherical zirconium, spherical crosslinked silicone resin particle and the like.

The surface roughness (Ra) of a film is a center line average roughness obtained in accordance with JIS B0601-1982 and expressed as a value (Ra: nm) obtained by the following equation when a portion having a measurement length L is picked up from a film surface roughness curve in the direction of the center line thereof, the center line of this picked-up portion is designated as the X axis, a vertical magnification direction of the portion is designated as the Y axis and the roughness curve is represented by Y=f(x).

$$Ra = \frac{1}{L} \int_0^L |f(x)| dx$$

In the present invention, the standard length is 0.25 mm and Ra is expressed as an average value of four measured values obtained by conducting the measurement five times and excluding the greatest value from the resulting measured values.

The biaxially oriented film of the present invention has such a laminate structure that a first layer formed from a polyester and a second layer formed from a polycarbonate and a polyester are laminated. Owing to such a structure, when the second layer is laminated on a metal plate so that it is in contact with the metal plate and the first layer is in contact with the contents of a metal can, the flavor retaining property of the entire film is improved by protecting the second layer having poor flavor retaining property with the first layer having excellent flavor retaining property, thereby preventing odor components contained in the contents of the metal can from being adsorbed on the film or the flavor of the contents from being spoiled by the smell of the film.

The double-layer structured biaxially oriented film may be produced, for example, by the following processes: (1) a process comprising the steps of melting separately a polyester and a composition comprising a polycarbonate and a polyester which constitute respective layers, co-extruding, laminating and fusing together, biaxially orienting and heat setting, and (2) a process comprising the steps of melting and extruding a polycarbonate and a composition comprising a polycarbonate and polyesters separately to form separate films, and orienting, laminating and fusing the films together.

The biaxially orientation is conducted, for example, by a sequential biaxial orientation method, a simultaneous biaxial orientation method, an inflation method and the like.

The thus obtained film of the present invention has a total thickness of 5 to 100 µm, preferably 10 to 75 µm. The thickness ratio (A/B) of the first layer (A) to the second layer (B) is preferably 1/99 to 50/50, more preferably 5/95 to 40/60, particularly preferably 10/90 to 30/70.

The first layer (A) and second layer (B) of the biaxially oriented film of the present invention need to have a plane orientation coefficient of 0.05 to 0.10.

The plane orientation coefficient is defined by the following equation.

$$f=|(n_x+n_y)/2|-n_z$$

In the above equation, f is a plane orientation coefficient, and $n_x$, $n_y$ and $n_z$ are each a refractive index of a film in the transverse, longitudinal and thickness directions.

The refractive index is measured in the following manner. A polarizing plate analyzer is attached to an eyepiece side of an Abbe refractometer and the refractive indices of a film in the respective directions are measured with an NaD monochromatic ray. Methylene iodide is used as a mount solution and the measurement temperature is 25° C.

If the plane orientation coefficient is too small, such a problem as cracking is likely to occur when the drawing ratio of deep drawing is high, while if the plane orientation coefficient is too large, rupture is liable to occur during deep drawing.

The biaxially oriented film of the present invention preferably has a heat shrinkage of 10% or less at 150° C. as an entire film.

The heat shrinkage is obtained as follows. Two points (at an interval of about 10 cm) on a sample film are marked at room temperature, the sample film is placed and kept for 30 minutes in an oven in which a 150° C. hot air is circulated, cooled to room temperature, measured for the interval between the above marked points to obtain the difference of the interval before and after heating at 150° C., and the heat shrinkage is calculated from the difference and the interval between the marked points before heating at 150° C.

When the heat shrinkage (at 150° C.) of the film is too large, a size reduction is large when the film is laminated on a metal plate with the result that a defect such as a wrinkle formed on the film is liable to occur.

The temperature of a peak located at the highest temperature of the loss elastic modulus (E") of the biaxially oriented film of the present invention is advantageously in the range of 100° to 160° C.

The loss elastic modulus (E") is obtained at a measurement frequency of 10 Hz and at a dynamic displacement of $\pm 25 \times 10^{-4}$ cm using a dynamic visco-elasticity measuring instrument.

The temperature of a peak located at the highest temperature of the loss elastic modulus (E") can be adjusted according to the composition of the polycarbonate and the polyester and the degrees of melt-mixing. If the highest peak temperature is higher than 160° C., it is likely that the drawing of the film becomes difficult and consequently, continuous film forming properties deteriorate. If the highest peak temperature is lower than 100° C., the impact resistance of the film after can making is liable to deteriorate disadvantageously.

Further, it is advantageous that the breaking elongation $(E_M)$ at 100° C. in the machine direction and the breaking elongation $(E_T)$ at 100° C. in the transverse direction of the biaxially oriented film of the present invention satisfy both of the following expressions.

$(E_M+E_T)/2>150$, and $-50 \leq E_M - E_T \leq 250$

The breaking elongation at 100° C. is an elongation (%) at the time when a 10 mm wide rectangular sample is broken during a tensile test conducted on the sample using a tensile tester equipped with a heating probe under the conditions of a temperature of 100° C., a chuck interval of 10 cm and a stress rate of 10 cm/min. The machine direction is a direction of film extrusion and perpendicular to the traverse direction.

The breaking elongation at 100° C. can be adjusted according to the composition of the polycarbonate and the polyester, the degrees of melt-mixing, and film drawing conditions. If the value $(E_M+E_T)/2$ is 150 or less, the drawing of the film will be difficult and continuous film forming properties will remarkedly deteriorate. If the value $E_M-E_T$ is smaller than −50, the film will become fragile and rupture is liable to occur in the film conveyance step. If the value is larger than 250, the anisotropy of the film will go to extremes and impact resistance at low temperatures after lamination will noticeably deteriorate.

It is advantageous that the biaxially oriented film of the present invention have the difference (Tcc4−Tcc1) between the peak temperature (Tcc1) of low-temperature crystallization in a DSC of a sample prepared by melting and quenching the film and the peak temperature (Tcc4) of low-temperature crystallization in the DSC of a sample prepared by further subjecting the above sample to the melting and quenching three cycles (or totally four cycles), in the range of 10° to 60° C.

Tcc1 and Tcc4 are measured as follows.

20 mg of a sample is heated from room temperature to 290° C. at a rate of 20° C./min. and kept at that temperature for 3 minutes, and the sample cell is taken out to quench and solidify the sample on an aluminum foil laid over ice. This sample is heated in an DSC at a rate of 20° C./min. and the peak temperature Tcc1 of low-temperature crystallization of the sample is read.

Similarly, 20 mg of a sample is heated from room temperature to 290° C. at a rate of 20° C./min., kept at that temperature for 3 minutes, and quenched and solidify on an aluminum foil laid on ice. This processing is repeated four times. Then this sample is heated in a DSC at a rate of 20° C./min. and the peak temperature Tcc4 of low-temperature crystallization of the film is read.

The peak temperatures Tcc1 and Tcc4 of low-temperature crystallization can be adjusted according to the composition of the polycarbonate and polyester, the degrees of melting and mixing, and type and amount of a phosphorus compound to be added. When the difference (Tcc4−Tcc1) between the peak temperatures of low-temperature crystallization is less than 10° C., the drawing of the film becomes difficult and continuous film forming properties sharply deteriorate. When the difference is more than 60° C., impact resistance after can making deteriorates, which is undesirable.

To obtain the biaxially oriented film of the present invention, an unoriented film is drawn and heat set by selecting and combining appropriate draw ratios and a heat setting temperature from the range of draw ratio in a longitudinal direction from 2.5 to 3.6 times and the range of draw ratio in a transverse direction from 2.7 to 3.6 times and the temperature range from 150° to 220° C., preferably from 160° to 200° C.

The biaxially oriented film of the present invention, as described above, comprises the first layer and the second layer and may have further a third layer adjacent to the second layer.

In this case, the third layer is formed from a polyester comprising ethylene terephthalate as a main recurring unit. Illustrative examples of the polyester are the same as those provided for the first layer. Therefore, it should be understood that description for the polyester of the first layer is also effective for the polyester of the third layer.

As for the biaxially oriented film having a third layer of the present invention, it should be understood that the plane orientation coefficient and Ra of the third layer are the same as those of the second layer of the biaxially oriented film of the present invention which consists of the above two layers.

The thickness of the third layer is preferably 0.5 to 10 μm.

As a metal plate to be laminated with the biaxially oriented film of the present invention, particularly a metal plate for can making, tin-plated steel, tin-free steel plate, aluminum plate and other metal plates are suitable. The film may be laminated on such a metal plate in the following manners.

(1) A metal plate is heated at a temperature higher than the softening temperature of the film, laminated with the film, cooled and bonded to the film.

(2) The film is preliminarily coated with a primer coating to form an adhesive layer and laminated on a metal plate with the adhesive layer adjacent to the metal plate. Any known adhesive can be used, such as epoxy-based adhesives, epoxy/ester-based adhesives, alkyd-based adhesives and the like.

To laminate the biaxially oriented film of the present invention on a metal plate, it is preferred that the second layer formed from a composition comprising a polycarbonate and a polyester or a third layer formed from a polyester be arranged to be in contact with the metal plate and a first layer of a polyester be arranged to be allowed to be in contact with the contents of a metal can in order to improve impact resistance, adhesion to the metal plate and flavor retaining property. For instance, to laminate the biaxially oriented film of the present invention which consists of a first layer and a second layer on the inside of a metal can, the second layer should be brought into contact with the can.

The following examples are given to further illustrate the present invention. However, the present invention is not limited to these Examples. In Examples, "parts" means "parts by weight". The measurement of characteristic values of a polyester and a polycarbonate and the evaluation of a film were carried as follows.

(1) Intrinsic viscosity $|\eta|$ of polyester

Measured at 35° C. in orthochlorophenol.

(2) Melting point (Tm) and glass transition temperature (Tg) of polyester

Measured in a Differential Scanning Calorimeter (DSC).

(3) Terminal carboxyl group concentration of polyester

Determined by titration with a NaOH benzyl alcohol solution in a mixture solvent of phenol and tetrachloroethane (2:3) using tetrabromophenol blue as an indicator.

(4) Viscosity-average molecular weight (Mv) of polycarbonate

Calculated from an intrinsic viscosity ($|\eta|$) measured in a methylene chloride solution using the following Schnell equation.

$$\text{Log } Mv = \frac{1}{0.83} \log \frac{|\eta|}{1.23 \times 10^{-4}}$$

(5) Terminal hydroxyl group concentration of polycarbonate

Determined by colorimetry (Die Makromol. Chem. 88 (1965) pp. 215) based on the interaction between $TiCl_4$ and the terminal hydroxyl group.

(6) Extrusion moldability of film

The extruded state of a molten polymer is observed and evaluated based on the following criteria ◎: No melt swing occurs and extremely stable extrusion molding is possible.

○: Almost no melt swing occurs and stable extrusion molding is possible.

Δ: Melt swing sometimes occurs and extrusion molding is unstable.

x: Melt swing frequently occurs and stable extrusion molding is substantially impossible.

(7) Drawability of film

The drawn state of a film is observed and evaluated based on the following criteria.

◯: No rupture occurs and extremely stable drawing is possible.

⊙: Almost no rupture occurs and stable drawing is possible.

Δ: Rupture sometimes occurs and drawing is unstable.

x: Rupture frequently occurs and stable drawing is substantially impossible.

(8) Surface roughness (Ra)

Measured under conditions of a needle radius of 2 μm, a contact pressure of 0.03 g, and a cutoff value of 0.25 mm using a needle contact type surface roughness meter (SURFCORDER SE-30C manufactured by Kosaka Laboratories Ltd.).

(9) Continuous film forming properties 48 hours of continuous film formation is performed to evaluate continuous film forming properties based on the following criteria.

◯: During 48 hours of continuous film formation, film rupture occurs 1 time or less.

⊙: During 48 hours of continuous film formation, film rupture occurs 2 to 3 times.

Δ: During 48 hours of continuous film formation, film rupture occurs 4 to 5 times.

x: During 48 hours of continuous film formation, film rupture occurs 6 times or more.

(10) Average major diameter of polycarbonate

A sample of a biaxially oriented film is sliced with microtome (in parallel to the film-width direction and perpendicular to the direction) to prepare a sample slice. A polycarbonate portion of this slice sample is dyed with $RuO_4$ and photomicrographed with a transmission electron microscope (acceleration voltage of 100 KV) to measure at least 20 major diameters of the polycarbonate from the thus obtained photomicrograph (magnification: 5,000 to 10,000×) and obtain an average value of them.

(11) Highest peak temperature of loss elastic modulus (E")

The loss elastic modulus (E") is obtained at a measurement frequency of 10 Hz and a dynamic displacement of $\pm 25 \times 10^{-4}$ cm using a dynamic visco-elasticity measuring instrument and the temperature of a peak located at the highest temperature of this loss elastic modulus is taken as the highest peak temperature of the loss elastic modulus (E").

(12) Breaking elongation at 100° C.

Using a tensile tester equipped with a heating probe (Tensilon Universal Tensile Tester of Toyo Baldwin Co.), a tensile test is performed on a 10 mm wide rectangular sample at a measurement temperature of 100° C., a chuck interval of 10 cm and a stress rate of 10 cm/min. Elongation (%) at the time when the sample is broken is obtained and taken as breaking elongation at 100° C.

(13) Peak temperature of low-temperature crystallizations (Tcc1 and Tcc4)

Using a DSC, 20 mg of a sample is heated from room temperature to 290° C. at a rate of 20° C./min., kept at that temperature for 3 minutes, and quenched. The quenched sample is heated again at a rate of 20° C./min. and the peak temperature of low-temperature crystallization measured is taken as Tcc1.

Similarly, after the above cycle consisting of heating, keeping at a high temperature and quenching is repeated four times, the peak temperature of low-temperature crystallization measured by heating the quenched sample again at a rate of 20° C./min. is taken as Tcc4.

(14) Peel strength

Two films of the same type are placed upon each other between two 210 μm thick steel plates which have been treated with chromic acid in an electrolysis in such a manner that a layer to be evaluated for peel strength is arranged outside (in contact with a metal plate), and laminated with the steel plates by holding these with a hot press heated at 285° C. at a pressure of 20 kg/cm$^2$ for 30 seconds. The resulting laminate plate is cut to prepare a 10 mm wide and 50 mm long sample piece. A release agent is beforehand applied to a 20 mm wide end portion of this sample piece so that the laminate plate can be easily separated, the two steel plates are separated from each other in the opposite directions at the 20 mm wide portion having the release agent applied thereto to form a T-letter shape, and both ends of separated portions are fixed by a tensile tester to measure peel strength at a stress rate of 20 mm/min. (in accordance with JIS K6854).

(15) Impact resistance at low temperatures

A laminate plate is prepared from a single film and a single steel plate in the same manner as in (8) above. The laminate plate is kept in water having a temperature of 50° C. for 5 days after production and then, an impact deformation test is conducted on this laminate plate at 5° C. in accordance with a method described in JIS K5400.

That is, a striking mold having a curvature radius of 5 mm is set on the surface of the laminate plate where the film is not laminated and a 300 g dead weight is dropped onto the striking mold from a height of 20 cm. At this time, a 5 mm thick rubber plate is laid under the laminate plate.

After subjecting to this impact deformation test, one electrode is set to a metal surface of the laminate plate where the film is not laminated, while another electrode is set to a cotton impregnated with a 1% saline solution, the cotton having been placed on a position (recess) of the other film surface of the laminate plate which has received the fallen dead weight. A voltage of 6 V is applied to measure a current value. The smaller the current value (mA) the better impact resistance at low temperatures becomes.

(16) Flavor retaining property

The laminate plate is cut into a 150 mm-diameter disk which is deep drawn with a drawing dice and a punch in four stages to prepare a 55 mm diameter container having seamless side surface (to be referred to as "can" hereinafter).

This metal can laminated with a film on the inner surface is filled with an aqueous solution of 20 ppm d-limonene and left to stand for 5 days. Thereafter, the film is removed, and a 15 cm×15 cm piece is cut out from the removed film and heated at 80° C. for 30 minutes to determine the quantity of the d-limonene adsorbed per 1 g of the film by a gas chromatography. The smaller the value, the better the flavor retaining property becomes. The flavor retaining property is evaluated based on the following criteria.

◯: The quantity of adsorption is equal to or smaller than that of polyethylene terephthalate.

Δ: The quantity of adsorption is slightly larger than that of polyethylene terephthalate.

x: The quantity of adsorption is larger than that of polyethylene terephthalate.

EXAMPLES 1 TO 8 AND COMPARATIVE EXAMPLES 1 TO 4

|production of polymer for polyester film layer (first layer (A)|

Polyethylene terephthalate copolymerized with 12 mol % of isophthalic acid (having intrinsic viscosity of 0.64, prepared in the presence of a germanium dioxide catalyst, and containing 0.3% by weight of titanium dioxide having a particle diameter ratio of 1.1 and an average particle diameter of 0.3 μm) was obtained by a solid-phase polymerization method. This polyester had a melting point of 229° C. and a glass transition temperature of 73° C.

|production of polycarbonate|

216 parts of diphenyl carbonate, 228 parts of bisphenol A and 0.05 part of di-sodium salt of bisphenol A were charged into a reactor equipped with a stirrer and a vacuum distillation system having a nitrogen gas introduction port, and the reaction system was substituted with nitrogen by repeating the operation of introducing a nitrogen gas three times after vacuum deaeration at room temperature. Thereafter, a reaction was carried out by heating at 190° C. at normal pressure for 30 minutes, and the pressure was gradually reduced at that temperature to 50 mmHg in 60 minutes. Further, the reaction temperature was raised from 190° C. to 290° C. in about 60 minutes and at the same time the degree of vacuum was changed from 50 mmHg to 1 mmHg or less. Along with the proceeding of the reaction, phenol produced by the reaction distilled out. The reaction was carried out for 40 minutes under the same conditions to obtain a polycarbonate having a terminal hydroxyl group concentration of 73 eq./$10^6$ g and a viscosity-average molecular weight (Mv) of 26,000.

|production of polymer for polycarbonate/polyester composition film layer (second layer (B)) and production of laminate film|

The above polycarbonate and a polyester mixture prepared by mixing polyethylene terephthalate and polybutylene terephthalate in a proportion shown in Table 1 were mixed in a proportion shown in Table 1 and 60 ppm (in terms of phosphorus concentration) of phosphoric acid was added as a phosphorus compound. The resulting mixture was co-extruded with the first layer (A) using a double-layer die to obtain a double-layer unoriented film. Here, in this extrusion, after drying, the polyester polymer of the first layer (A) was melt extruded at a polymer temperature of about 280° C. and the second layer (B) was also melt extruded at a polymer temperature of about 290° C. using an extruder. A laminate film polymer melt extruded from the double-layer die was cooled and taken up on a casting roller to obtain an unoriented film. Thereafter, this unoriented film was drawn to 3.0 times in a longitudinal direction at 130° C. and then to 3.0 times in a transverse direction at 135° C., and heat set at 180° C. to produce a biaxially oriented laminate film.

TABLE 1

| | Polycarbonate (% by weight) | Polyester (% by weight) | Polyethylene terephthalate (% by weight) | Polybutylene terephthalate (% by weight) |
|---|---|---|---|---|
| Comp. Ex. 1 | 18 | 82 | 60 | 40 |
| Ex. 1 | 22 | 78 | 60 | 40 |
| Ex. 2 | 40 | 60 | 60 | 40 |
| Comp. Ex. 2 | 62 | 38 | 60 | 40 |
| Comp. Ex. 3 | 40 | 60 | 8 | 92 |
| Ex. 3 | 40 | 60 | 12 | 88 |
| Ex. 4 | 40 | 60 | 20 | 80 |
| Ex. 5 | 40 | 60 | 40 | 60 |

TABLE 1-continued

| | Polycarbonate (% by weight) | Polyester (% by weight) | Polyethylene terephthalate (% by weight) | Polybutylene terephthalate (% by weight) |
|---|---|---|---|---|
| Ex. 6 | 40 | 60 | 80 | 20 |
| Ex. 7 | 40 | 60 | 85 | 15 |
| Ex. 8 | 40 | 60 | 88 | 12 |
| Comp. Ex. 4 | 40 | 60 | 92 | 8 |

Comp. Ex.: Comparative Example
Ex.: Example

The thus obtained biaxially oriented film had a plane orientation coefficient of 0.06 for the first layer (A) and 0.05 for the second layer (B), and a thickness of 6 μm for the first layer (A) and 24 μm for the second layer (B). The heat shrinkage at 150° C. of this film was 5 to 7%.

The above polyethylene terephthalate and polybutylene terephthalate were both obtained by a solid-phase polymerization method. The former had an intrinsic viscosity of 0.64, a melting point of 255° C., a glass transition temperature of 78° C. and a terminal carboxyl group concentration of 15 eq./$10^6$ g when a germanium dioxide catalyst was used, and the latter had an intrinsic viscosity of 1.1, a melting point of 223° C., a glass transition temperature of 32° C. and a terminal carboxyl group concentration of 10 eq./$10^6$ g when a tetrabutyl titanate catalyst was used.

The evaluation results are shown in Table 2. The biaxially oriented films of the present invention were excellent in extrusion moldability, drawability, adhesion to a metal plate, impact resistance at low temperatures and flavor retaining property.

TABLE 2

| | Extrusion moldability | Drawability | Peel strength (kg/cm) | Impact resistance at low-temperatures (mA) | Flavor retaining property |
|---|---|---|---|---|---|
| Comp. Ex. 1 | ○ | ○ | 6 | 0.5 | ○ |
| Ex. 1 | ⊚ | ⊚ | 6 | 0.2 | ○ |
| Ex. 2 | ⊚ | ⊚ | 3 | 0.1 | ○ |
| Comp. Ex. 2 | x | x | — | — | — |
| Comp. Ex. 3 | Δ | Δ | 3 | 0.5 | ○ |
| Ex. 3 | ○ | ○ | 2.5 | 0.1 | ○ |
| Ex. 4 | ○ | ○ | 2.5 | 0.1 | ○ |
| Ex. 5 | ⊚ | ⊚ | 3 | 0.1 | ○ |
| Ex. 6 | ⊚ | ⊚ | 3 | 0.1 | ○ |
| Ex. 7 | ○ | ○ | 3 | 0.1 | ○ |
| Ex. 8 | ○ | ○ | 3 | 0.1 | ○ |
| Comp. Ex. 4 | x | x | — | — | — |

Comp. Ex.: Comparative Example
Ex.: Example

COMPARATIVE EXAMPLE 5

When only the second layer (B) was used (thickness of 30 μm) without lamination of the first layer (A) in Example 2, odor retaining property (flavor retaining property) deteriorated to x.

EXAMPLES 9 TO 16 AND COMPARATIVE EXAMPLES 6 AND 7

[production of polycarbonate]

216 parts of diphenyl carbonate, 228 parts of bisphenol A and 0.05 part of di-sodium salt of bisphenol A were charged into a reactor equipped with a stirrer and a vacuum distillation system having a nitrogen gas introduction port, and the reaction system was substituted with nitrogen by repeating the operation of introducing a nitrogen gas three times after vacuum deaeration at room temperature. Thereafter, a reaction was carried out by heating at 190° C. at normal pressure for 30 minutes, and the pressure was gradually reduced at that temperature to 50 mmHg in 60 minutes. Further, the reaction temperature was raised from 190° C. to 290° C. in about 60 minutes and at the same time the degree of vacuum was changed from 50 mmHg to 1 mmHg or less. Along with the proceeding of the reaction, phenol produced by the reaction distilled out. The reaction was carried out for 40 minutes under the same conditions to obtain a polycarbonate having a terminal hydroxyl group concentration of 48 eq./$10^6$ g and a viscosity-average molecular weight (Mv) of 28,000. The thus obtained polycarbonate was mixed with 45 ppm (in terms of phosphorus concentration) of ADK STAB 2112 of Asahi Denka Kogyo Co. Ltd. as a phosphorus compound and melt extruded.

[production of laminate film]

Polyethylene terephthalate (having intrinsic viscosity of 0.75, prepared in the presence of a germanium dioxide catalyst, and containing 0.2% by weight of titanium dioxide having a particle diameter ratio of 1.1 and an average particle diameter of 0.3 µm) was obtained by a solid-phase polymerization method. This polyethylene terephthalate had a melting point of 255° C. and a glass transition temperature of 78° C. (polymer used for the first layer (A)).

40% by weight of the polycarbonate produced above and 60% by weight of a polyester comprising a polyethylene terephthalate-based polyester (70% by weight) and a polybutylene terephthalate-based polyester (30% by weight) shown in Table 3 were dry blended.

The polyethylene terephthalate-based polyester and the polybutylene terephthalate-based polyester were both obtained by a solid-phase polymerization method. In the former, a germanium dioxide catalyst was used, while in the latter, a tetrabutyl titanate catalyst was used. The intrinsic viscosity of a prepolymer and a solid-phase polymerization time in the solid-phase polymerization were changed and the terminal carboxyl group concentration was also changed as shown in Table 3.

TABLE 3

| | Kind | Intrinsic viscosity | Melting point (°C.) | Glass transition temperature (°C.) | Terminal carboxyl group concentration (eq./$10^6$ g) |
|---|---|---|---|---|---|
| PET-based polyester | | | | | |
| Comp. Ex. 6 | PET | 0.75 | 255 | 78 | 4 |
| Ex. 9 | PET | 0.75 | 255 | 78 | 12 |
| Ex. 10 | PET | 0.75 | 255 | 78 | 20 |
| Ex. 11 | PET | 0.75 | 255 | 78 | 30 |
| Ex. 12 | PET | 0.75 | 255 | 78 | 30 |
| Ex. 13 | PET | 0.75 | 255 | 78 | 30 |
| Comp. Ex. 7 | PET | 0.75 | 255 | 78 | 30 |
| Ex. 14 | PETI12 | 0.75 | 229 | 74 | 25 |
| Ex. 15 | PETI12 | 0.75 | 229 | 74 | 12 |
| Ex. 16 | PETI12 | 0.75 | 229 | 74 | 30 |

TABLE 3-continued

| | Kind | Intrinsic viscosity | Melting point (°C.) | Glass transition temperature (°C.) | Terminal carboxyl group concentration (eq./$10^6$ g) |
|---|---|---|---|---|---|
| PBT-based polyester | | | | | |
| Comp. Ex. 6 | PBTI5 | 0.9 | 218 | 28 | 8 |
| Ex. 9 | PBTI5 | 0.9 | 218 | 28 | 8 |
| Ex. 10 | PBTI5 | 0.9 | 218 | 28 | 8 |
| Ex. 11 | PBTI5 | 0.9 | 218 | 28 | 8 |
| Ex. 12 | PBTI5 | 0.9 | 218 | 28 | 12 |
| Ex. 13 | PBTI5 | 0.9 | 218 | 28 | 18 |
| Comp. Ex. 7 | PBTI5 | 0.9 | 218 | 28 | 22 |
| Ex. 14 | PBT | 0.9 | 223 | 32 | 10 |
| Ex. 15 | PBT | 0.9 | 223 | 32 | 18 |
| Ex. 16 | PBTI5 | 0.9 | 218 | 28 | 8 |

Comp. Ex.: Comparative Example
Ex.: Example
PET: Polyethylene terephthalate
PETI12: PET copolymerized with 12 mol % of isophthalic acid
PBT: Polybutylene terephthalate
PBTI5: PBT copolymerized with 5 mol % of isophthalic acid The above polyethylene terephthalate and polycarbonate-polyester blend polymer were dried in a usual manner and each supplied into two extruders for forming a double-layer co-extruded laminate film and the blend polymer were melt extruded from a co-extrusion slit at a polymer temperature of 280° C. for the polyethylene terephthalate and at a polymer temperature of 280° to 290° C. for the blend polymer. The co-extruded film was cooled and taken up on a casting drum to produce an unoriented laminate film.

The unoriented film was then drawn to 3.0 times in a longitudinal direction at 135° C. and to 3.0 times in a transverse direction at 135° C., and heat set at 180° C. to produce a biaxially oriented film.

In the thus obtained biaxially oriented film, the polyethylene terephthalate layer had a thickness of 5 µm and a plane orientation coefficient of 0.07, and the blend polymer layer of the film had a thickness of 20 µm and a plane orientation coefficient of 0.06. The heat shrinkage at 150° C. of the film was 5 to 7%.

The evaluation results are shown in Table 4. When the terminal carboxyl group concentration of the polyethylene terephthalate-based polyester was 5 eq./$10^6$ g or more, and that of the polybutylene terephthalate-based polyester was 20 eq./$10^6$ g or less, a film having excellent adhesion to a metal plate could be obtained and the film forming properties (extrusion moldability and drawability) of the film were satisfactory.

TABLE 4

| | Extrusion moldability | Draw-ability | Peel strength (kg/cm) | Impact resistance at low-temperatures (mA) | Flavor retaining property |
|---|---|---|---|---|---|
| Comp. Ex. 6 | Δ | x | — | — | — |
| Ex. 9 | ○ | ○ | 2.5 | 0.1 | ○ |
| Ex. 10 | ○ | ○ | 2.5 | 0.1 | ○ |
| Ex. 11 | ○ | ○ | 2.5 | 0.1 | ○ |
| Ex. 12 | ○ | ○ | 3.0 | 0.1 | ○ |
| Ex. 13 | ○ | ○ | 3.5 | 0.1 | ○ |
| Comp. Ex. 7 | x | x | — | — | — |

TABLE 4-continued

|  | Extrusion moldability | Draw-ability | Peel strength (kg/cm) | Impact resistance at low-temperatures (mA) | Flavor retaining property |
|---|---|---|---|---|---|
| Ex. 14 | ○ | ○ | 2.0 | 0.1 | ○ |
| Ex. 15 | ○ | ○ | 2.0 | 0.1 | ○ |
| Ex. 16 | ○ | ○ | 2.5 | 0.1 | ○ |

Comp. Ex.: Comparative Example
Ex.: Example

EXAMPLES 17 TO 20

When 40% by weight of the polycarbonate used in Examples 1 to 8 was dry blended with 60% by weight of the polyester comprising polyethylene terephthalate and polybutylene terephthalate copolymerized with 5 mol % of isophthalic acid which was used in Example 11, ADK STAB 2112 of Asahi Denka Kogyo Co. Ltd. was added as a phosphorus compound in an amount shown in Table 5 (in terms of phosphorus concentration) and a laminate film was produced under the same conditions as in Example 11.

The results are shown in Table 5. When the addition of the phosphorus compound was 20 to 100 ppm, especially good results were obtained.

TABLE 5

|  | Addition of phosphorus compound (ppm) | Extrusion moldability | Draw-ability | Peel strength (kg/cm) | Impact resistance at low-temperatures (mA) | Flavor retaining property |
|---|---|---|---|---|---|---|
| Ex. 17 | 22 | ○ | ○ | 2.5 | 0.1 | ○ |
| Ex. 18 | 40 | ◎ | ◎ | 2.5 | 0.1 | ○ |
| Ex. 19 | 50 | ◎ | ◎ | 2.5 | 0.1 | ○ |
| Ex. 20 | 95 | ◎ | ◎ | 3.0 | 0.1 | ○ |

Ex.: Example

EXAMPLES 21 TO 27 AND COMPARATIVE EXAMPLES 8 TO 11

[production of polymer for polyester film layer (first layer (A))]

Polyethylene terephthalate copolymerized with 12 mol % of isophthalic acid (having intrinsic viscosity of 0.64, prepared in the presence of a germanium dioxide catalyst, and containing 0.1% by weight of silica having a particle diameter ratio of 1.1 and an average particle diameter of 0.3 μm) was obtained by a solid-phase polymerization method. This polyester had a melting point of 229° C. and a glass transition temperature of 73° C.

The same polycarbonate as in Examples 1 to 8 was used as a polycarbonate.

[production of polymer for polycarbonate.polyester composition film layer (second layer (B)) and production of laminate film]

The above polycarbonate and a polyester mixture prepared by mixing polyethylene terephthalate and polybutylene terephthalate in a proportion shown in Table 6 were mixed in a proportion shown in Table 6, 40 ppm (in terms of phosphorus concentration) of phosphoric acid was added as a phosphorus compound, and the resulting mixture was extruded with the first layer (A) using a double-layer die to obtain a double-layer unoriented film. In this instance, the polyester polymer of the first layer (A) was dried and melt extruded at a polymer temperature of about 280° C. and the second layer (B) was also melt extruded at a polymer temperature of about 290° C. using an extruder. The laminate film polymer melt extruded from the double-layer die was cooled and taken up on a casting roller to obtain an unoriented film. Thereafter, this unoriented film was drawn to 3.0 times in a longitudinal direction at 130° C. and to 3.4 times in a transverse direction at 140° C., and heat set at 180° C. to produce a biaxially oriented laminate film.

TABLE 6

|  | Polycarbonate (% by weight) | Polyester (% by weight) | Polyethylene terephthalate (% by weight) | Polybutylene terephthalate (% by weight) | Major diameter of dispersed polycarbonate particle (μm) |
|---|---|---|---|---|---|
| Comp. Ex. 8 | 18 | 82 | 40 | 60 | 0.9 |
| Ex. 21 | 22 | 78 | 40 | 60 | 0.7 |
| Ex. 22 | 40 | 60 | 40 | 60 | 1.7 |
| Comp. Ex. 9 | 62 | 38 | 40 | 60 | Drawing impossible |
| Comp. Ex. 10 | 40 | 60 | 8 | 92 | 0.3 |
| Ex. 23 | 40 | 60 | 12 | 88 | 0.8 |
| Ex. 24 | 40 | 60 | 20 | 80 | 1.0 |
| Ex. 25 | 40 | 60 | 60 | 40 | 3.1 |
| Ex. 26 | 40 | 60 | 80 | 20 | 4.3 |
| Ex. 27 | 40 | 60 | 88 | 12 | 15.0 |
| Comp. Ex. 11 | 40 | 60 | 92 | 8 | Drawing impossible |

Comp. Ex.: Comparative Example
Ex.: Example

The thus obtained biaxially oriented film had a plane orientation coefficient of 0.06 for the first layer (A) and 0.05 for the second layer (B) and a thickness of 6 μm for the first layer (A) and 24 μm for the second layer (B). The heat shrinkage at 150° C. of the film was 5 to 7%.

The polyethylene terephthalate and the polybutylene terephthalate were both obtained by a solid-phase polymerization method. The former was prepared in the presence of a germanium dioxide catalyst and had an intrinsic viscosity of 0.64, a melting point of 255° C., a glass transition temperature of 78° C. and a terminal carboxyl group concentration of 15 eq./$10^6$ g, and the latter was prepared in the presence of a tetrabutyl titanate catalyst and had an intrinsic viscosity of 1.1, a melting point of 223° C., a glass transition temperature of 32° C. and a terminal carboxyl group concentration of 10 eq./$10^6$ g.

The evaluation results are shown in Table 7. The biaxially oriented films of the present invention were excellent in extrusion moldability, drawability, adhesion to a metal plate, impact resistance at low temperatures and flavor retaining property.

TABLE 7

|  | Extrusion moldability | Draw-ability | Peel strength (kg/cm) | Impact resistance at low-temperatures (mA) | Flavor retaining property |
|---|---|---|---|---|---|
| Comp. Ex. 8 | ○ | ○ | 6 | 0.8 | ○ |
| Ex. 21 | ◎ | ◎ | 6 | 0.2 | ○ |
| Ex. 22 | ◎ | ◎ | 3 | 0.1 | ○ |
| Comp. Ex. 9 | x | x | — | — | — |
| Comp. Ex. 10 | Δ | Δ | 3 | 0.5 | ○ |
| Ex. 23 | ○ | ○ | 2.5 | 0.1 | ○ |

TABLE 7-continued

|  | Extrusion moldability | Drawability | Peel strength (kg/cm) | Impact resistance at low-temperatures (mA) | Flavor retaining property |
|---|---|---|---|---|---|
| Ex. 24 |  |  | 2.5 | 0.1 |  |
| Ex. 25 | ◎ | ◎ | 3 | 0.1 |  |
| Ex. 26 | ○ | ○ | 3 | 0.1 |  |
| Ex. 27 |  |  | 3 | 0.1 |  |
| Comp. Ex. 11 | x | x | — | — | — |

Comp. Ex.: Comparative Example
Ex.: Example

EXAMPLES 28 TO 34 AND COMPARATIVE EXAMPLES 12 AND 13

Biaxially oriented films were obtained in the same manners as in Examples 9 to 16 and Comparative Examples 6 and 7 except that only the terminal carboxyl group concentrations of the PET-based polyesters and PBT-based polyesters used in Examples 9 to 16 and Comparative Examples 6 and 7 were changed as shown in Table 8 below, respectively.

The results are shown in Tables 8 and 9.

TABLE 8

| | PET Terminal carboxyl group concentration (eq./$10^6$ g) | PBT Terminal carboxyl group concentration (eq./$10^6$ g) | Major diameter of dispersed polycarbonate particle (μm) |
|---|---|---|---|
| Comp. Ex. 12 | 4 | 6 | Drawing impposible |
| Ex. 28 | 15 | 6 | 6.7 |
| Ex. 29 | 25 | 6 | 4.3 |
| Ex. 30 | 35 | 6 | 2.8 |
| Ex. 31 | 35 | 10 | 3.7 |
| Comp. Ex. 13 | 35 | 25 | Drawing impposible |
| Ex. 32 | 30 | 8 | 3.0 |
| Ex. 33 | 15 | 16 | 4.1 |
| Ex. 34 | 35 | 6 | 3.5 |

Comp. Ex.: Comparative Example
Ex.: Example

TABLE 9

|  | Extrusion moldability | Drawability | Peel strength (kg/cm) | Impact resistance at low-temperatures (mA) | Flavor retaining property |
|---|---|---|---|---|---|
| Comp. Ex. 12 | Δ | x | — | — | — |
| Ex. 28 | ◎ |  | 3.0 | 0.1 | ○ |
| Ex. 29 | ◎ | ◎ | 2.5 | 0.1 | ○ |
| Ex. 30 | ◎ | ◎ | 2.5 | 0.1 | ○ |
| Ex. 31 | ◎ | ◎ | 2.5 | 0.1 | ○ |
| Comp. Ex. 13 | x | x | — | — | — |
| Ex. 32 | ◎ | ◎ | 2.5 | 0.1 | ○ |
| Ex. 33 | ○ | ○ | 2.5 | 0.1 | ○ |
| Ex. 34 | ◎ | ◎ | 2.5 | 0.1 | ○ |

Comp. Ex.: Comparative Example
Ex.: Example

EXAMPLES 35 TO 43 AND COMPARATIVE EXAMPLES 14 TO 17

The same polymer for the polyester film layer (first layer (A)) and the same polymer for the polycarbonate.polyester composition film layer (second layer (B)) as used in Examples 1 to 8 and Comparative Examples 1 to 4 were used.

|production of polymer for polyester film layer (third layer (C))|

Polyethylene terephthalate copolymerized with 15 mol % of isophthalic acid (having intrinsic viscosity of 0.60, prepared in the presence of a germanium dioxide catalyst) was obtained by a solid-phase polymerization method. This polyester had a melting point of 218° C. and a glass transition temperature of 72° C.

|production of laminate film|

The polyester for the first layer (A), the polycarbonate-.polyester composition for the second layer (B) and the polyester for the third layer © described above were co-extruded using a three-layer die and laminated in the above order to produce a three-layer unoriented laminate film.

The polyester polymers of the first layer (A) and the third layer (C) were dried and melt extruded at a polymer temperature of about 280° C. The second layer (B) was also melt extruded at a polymer temperature of about 290° C. using an extruder. A laminate film polymer melt extruded from the three-layer die was cooled and taken up on a casing roller to obtain an unoriented film. The unoriented film was then drawn to 3.0 times in a longitudinal direction at 130° C. and to 3.0 times in a transverse direction at 135° C., an heat set at 180° C. to produce a biaxially oriented laminate film.

The thus obtained biaxially oriented film had a plane orientation coefficient of 0.06 for the first layer (A), 0.05 for the second layer (B) and 0.06 for the third layer (C), and a thickness of 3 μm for the first layer (A), 24 μm for the second layer (B) and 3 μm for the third layer (C). The heat shrinkage at 150° C. of the film was 5 to 7%.

The evaluation results are shown in Table 10. The three-layer biaxially oriented laminate films of the present invention were excellent in extrusion moldability, drawability, impact resistance at low temperatures and flavor retaining property and had greatly improved adhesion to a metal plate.

Table 10 shows also the melting points of polyesters and polycarbonates used in the compositions of the second layer (B).

TABLE 10

|  | Melting point of comosition (°C.) | Extrusion moldability | Drawability | Peel strength (kg/cm) | Impact resistance at low-temperatures (mA) | Flavor retaining property |
|---|---|---|---|---|---|---|
| Comp. Ex. 14 | *251/220 | ○ | ○ | 7 | 0.5 | ○ |
| Ex. 35 | 250/220 | ◎ | ◎ | 7 | 0.2 | ○ |
| Ex. 36 | 251/221 | ◎ | ◎ | 7 | 0.1 | ○ |
| Ex. 37 | 251/— | ◎ | ◎ | 7 | 0.1 | ○ |
| Comp. Ex. 15 | 251/— | x | x | — | — | — |
| Comp. Ex. 16 | —/224 | Δ | Δ | 7 | 0.5 | ○ |
| Ex. 38 | —/224 | ○ | ○ | 7 | 0.1 | ○ |
| Ex. 39 | —/223 | ○ | ○ | 7 | 0.1 | ○ |
| Ex. 40 | 251/221 | ◎ | ◎ | 7 | 0.1 | ○ |
| Ex. 41 | 252/— | ◎ | ◎ | 7 | 0.1 | ○ |
| Ex. 42 | 252/— | ○ | ○ | 7 | 0.1 | ○ |

TABLE 10-continued

| | Melting point of comosition (°C.) | Extrusion moldability | Drawability | Peel strength (kg/cm) | Impact resistance at low-temperatures (mA) | Flavor retaining property |
|---|---|---|---|---|---|---|
| Ex. 43 | 253/— | ◊ | ◊ | 7 | 0.1 | ◊ |
| Comp. Ex. 17 | 253/— | x | x | — | — | — |

Comp. Ex.: Comparative Example
Ex.: Example
*: Melting point of polyethylene terephthalate/Melting point of polybutylene terephthalate

EXAMPLES 44 TO 51 AND COMPARATIVE EXAMPLES 18 AND 19

The same polymer for the first layer (A) and the same polycarbonate.polyester composition for the second layer (B) as used in Examples 9 to 16 and Comparative Examples 6 and 7 were used.

[production of polymer for polyester film layer (third layer (C))]

Polyethylene terephthalate copolymerized with 7 mol % of isophthalic acid (having an intrinsic viscosity of 0.64, prepared in the presence of a germanium dioxide catalyst) was obtained by a solid-phase polymerization method. This polyester had a melting point of 238° C. and a glass transition temperature of 76° C.

[production of laminate film]

The polyethylene terephthalate, the polycarbonate.polyester composition and the copolymer of polyethylene terephthalate described above were dried in a usual manner and each supplied into three extruders for forming a three-layer co-extruded laminate film. The polyethylene terephthalate, the polycarbonate.polyester composition and the copolymer of polyethylene terephthalate were melt extruded from a co-extrusion slit at a polymer temperature of 280° C., 280° to 290° C. and about 280° C., respectively. The co-extruded film was cooled and taken up on a casting roll to produce an unoriented laminate film in which the above polymers were laminated in the above order.

The unoriented film was then drawn to 3.0 times in a longitudinal direction at 135° C. and to 3.0 times in a transverse direction at 135° C., and heat set at 180° C. to produce a biaxially oriented laminate film.

The thus obtained biaxially oriented film had a plane orientation coefficient of 0.07 for the first layer (A) (polyethylene terephthalate layer) and 0.06 for the second layer (B) (polycarbonate.polyester layer), and a thickness of 5 μm for the first layer (A), 20 μm for the second layer (B) and 1 μm for the third layer (C) (copolymer of polyethylene terephthalate layer). The heat shrinkage at 150° C. of the film was 5 to 7%.

The evaluation results are shown in Table 11. Films having excellent adhesion to a metal plate were obtained and film forming properties (extrusion moldability and drawability) were satisfactory when the terminal carboxyl group concentration of the polyethylene terephthalate-based polyester in the second layer (B) was 5 eq./$10^6$ g or more and that of the polybutylene terephthalate-based polyester was 20 eq./$10^6$ g or less.

TABLE 11

| | Extrusion moldability | Drawability | Peel strength (kg/cm) | Impact resistance at low-temperatures (mA) | Flavor retaining property |
|---|---|---|---|---|---|
| Comp. Ex. 18 | Δ | x | — | — | — |
| Ex. 44 | ○ | ◊ | 6 | 0.1 | ◊ |
| Ex. 45 | ○ | ○ | 6 | 0.1 | ◊ |
| Ex. 46 | ○ | ○ | 6 | 0.1 | ◊ |
| Ex. 47 | ○ | ○ | 6 | 0.1 | ◊ |
| Ex. 48 | ◊ | ◊ | 6 | 0.1 | ◊ |
| Comp. Ex. 19 | x | x | — | — | — |
| Ex. 49 | ○ | ○ | 6 | 0.1 | ◊ |
| Ex. 50 | ◊ | ◊ | 5.5 | 0.1 | ◊ |
| Ex. 51 | ○ | ◎ | 6 | 0.1 | ◊ |

Comp. Ex.: Comparative Example
Ex.: Example

EXAMPLES 52 TO 55

When 40% by weight of the polycarbonate used in Examples 35 to 43 and 60% by weight of the polyester comprising polyethylene terephthalate and polybutylene terephthalate copolymerized with 5 mol % of isophthalic acid as used in Example 46 were dry blended, ADK STAB 2112 of Asahi Denka Kogyo Co. was added as a phosphorus compound in an amount (in terms of phosphorus concentration) shown in Table 12 and a laminate film was produced under the same conditions as in Example 46.

The results are shown in Table 12 and when the addition of the phosphorus compound was 20 to 100 ppm, especially good results were obtained.

TABLE 12

| | Phosphorus compound added (ppm) | Extrusion moldability | Drawability | Peel strength (kg/cm) | Impact resistance at low-temperatures (mA) | Flavor retaining property |
|---|---|---|---|---|---|---|
| Ex. 52 | 22 | ○ | ○ | 6 | 0.1 | ◊ |
| Ex. 53 | 40 | ◎ | ◎ | 6 | 0.1 | ◊ |
| Ex. 54 | 50 | ◎ | ◎ | 6 | 0.1 | ◊ |
| Ex. 55 | 95 | ◎ | ○ | 6 | 0.1 | ◊ |

Ex.: Example

EXAMPLES 56 TO 62

In Example 36, the amount of the isophthalic acid to be copolymerized in the polyester of the third layer (C) was changed as shown in Table 13. The melting point of each polyester is shown in Table 13.

TABLE 13

| | Amount of isophthalic acid copolymerized (mol %) | Melting point (°C.) |
|---|---|---|
| Ex. 56 | 0 (polyethylene terephthalate) | 255 |
| Ex. 57 | 2 | 250 |
| Ex. 58 | 4 | 245 |

TABLE 13-continued

|  | Amount of isophthalic acid copolymerized (mol %) | Melting point (°C.) |
|---|---|---|
| Ex. 59 | 10 | 230 |
| Ex. 60 | 15 | 218 |
| Ex. 61 | 20 | 205 |
| Ex. 62 | 25 | 193 |

Ex.: Example

The results are shown in Table 14. When the amount of isophthalic acid copolymerized was 3 to 20 mol % (Examples 58 to 61), especially good results were obtained.

TABLE 14

|  | Extrusion moldability | Draw-ability | Peel strength (kg/cm) | Impact resistance at low-temperatures (mA) | Flavor retaining property |
|---|---|---|---|---|---|
| Ex. 56 | ⊚ | ○ | 5 | 0.1 | ○ |
| Ex. 57 | ⊚ | ○ | 5.5 | 0.1 | ○ |
| Ex. 58 | ⊚ | ○ | 6 | 0.1 | ○ |
| Ex. 59 | ⊚ | ○ | 6.5 | 0.1 | ○ |
| Ex. 60 | ⊚ | ○ | 7 | 0.1 | ○ |
| Ex. 61 | ○ | ○ | 7.5 | 0.1 | ○ |
| Ex. 62 | ○ | ○ | 8 | 0.1 | ○ |

Ex.: Example

EXAMPLES 63 TO 68

In Example 46, the thickness of the isophthalic acid copolymerized polyethylene terephthalate layer for the third layer (C) was changed as shown in Table 15 to ensure that the total thickness of the second layer (B) and the third layer (C) was 21 µm.

TABLE 15

|  | Thickness of third layer (°C.) (µm) | Extrusion moldability | Draw-ability | Peel strength (kg/cm) | Impact resistance at low-temperatures (mA) | Flavor retaining property |
|---|---|---|---|---|---|---|
| Ex. 63 | 0.1 | ○ | ○ | 4.5 | 0.2 | ○ |
| Ex. 64 | 0.5 | ○ | ○ | 5 | 0.1 | ○ |
| Ex. 65 | 2 | ○ | ○ | 6 | 0.1 | ○ |
| Ex. 66 | 5 | ○ | ○ | 6.5 | 0.1 | ○ |
| Ex. 67 | 8 | ○ | ○ | 7 | 0.1 | ○ |
| Ex. 68 | 12 | ○ | ○ | 7.5 | 0.3 | ○ |

Ex.: Example

EXAMPLES 69 TO 75 AND COMPARATIVE EXAMPLES 20 TO 23

Unoriented films were produced in the same manner as in Examples 1 to 8 and Comparative Examples 1 to 4 except that ADK STAB 2112 of Asahi Denka Kogyo Co. Ltd. was used in a proportion shown in Table 16 in place of 60 ppm of phosphoric acid and the composition of the second layer (B) was changed as shown in Table 16.

TABLE 16

|  | Polycarbonate (% by weight) | Polyester (% by weight) | Polyethylene terephthalate (% by weight) | Polybutylene terephthalate (% by weight) | Phosphorus-based stabilizer (ppm) |
|---|---|---|---|---|---|
| Comp. Ex. 20 | 18 | 82 | 40 | 60 | 40 |
| Ex. 69 | 22 | 78 | 40 | 60 | 40 |
| Ex. 70 | 40 | 60 | 40 | 60 | 40 |
| Comp. Ex. 21 | 62 | 38 | 40 | 60 | 40 |
| Comp. Ex. 22 | 40 | 60 | 8 | 92 | 40 |
| Ex. 71 | 40 | 60 | 12 | 88 | 40 |
| Ex. 72 | 40 | 60 | 20 | 80 | 40 |
| Ex. 73 | 40 | 60 | 60 | 40 | 40 |
| Ex. 74 | 40 | 60 | 80 | 20 | 40 |
| Ex. 75 | 40 | 60 | 88 | 12 | 40 |
| Comp. Ex. 23 | 40 | 60 | 92 | 8 | 40 |

Comp. Ex.: Comparative Example
Ex.: Example

The results are shown in Table 15. When the thickness of the third layer (C) was 0.5 to 10 µm (Examples 64 to 67), especially good results were obtained. Particularly, when the thickness of the third layer was 1 to 5 µm (Examples 65 and 66), better results were obtained.

The evaluation results are shown in Table 17. The biaxially oriented laminate films of the present invention were excellent in extrusion moldability, drawability, adhesion to a metal plate, impact resistance at low temperatures and flavor retaining property.

TABLE 17

|  | Highest peak temperature (E") (°C.) | Extrusion moldability | Drawability | Peel strength (kg/cm) | Impact resistance at low-temperatures (mA) | Flavor retaining property |
|---|---|---|---|---|---|---|
| Comp. Ex. 20 | 130 | ○ | ○ | 6 | 0.5 | ○ |
| Ex. 69 | 142 | ○ | ○ | 6 | 0.2 | ○ |
| Ex. 70 | 144 | ○ | ○ | 3 | 0.1 | ○ |
| Comp. Ex. 21 | — | X | X | — | — | — |
| Comp. Ex. 22 | 108 | Δ | Δ | 3 | 0.5 | ○ |
| Ex. 71 | 112 | ○ | ○ | 2.5 | 0.1 | ○ |
| Ex. 72 | 120 | ○ | ○ | 2.5 | 0.1 | ○ |
| Ex. 73 | 148 | ○ | ○ | 3 | 0.1 | ○ |
| Ex. 74 | 156 | ○ | ○ | 3 | 0.1 | ○ |
| Ex. 75 | 157 | ○ | ○ | 3 | 0.1 | ○ |
| Comp. Ex. 23 | — | X | X | — | — | — |

Comp. Ex.: Comparative Example
Ex.: Example

EXAMPLES 76 TO 84 AND COMPARATIVE EXAMPLES 24 TO 27

The same polymer for the polyester film layer (first layer (A)) and the same polycarbonate as used in Examples 1 to 8 and Comparative Examples 1 to 4 were used.

[production of polymer for polycarbonate.polyester composition film layer (second layer (B)) and production of laminate film]

The above polycarbonate and a polyester mixture prepared by mixing polyethylene terephthalate copolymerized with 12 mol % of isophthalic acid as used in the first layer (A) and polybutylene terephthalate in a proportion shown in Table 18 were mixed in a proportion shown in Table 18. ADS STAB 2112 was added as a phosphorus compound in an amount shown in Table 18, and the resulting mixture was extruded together with the first layer (A) using a double-layer die to produce a double-layer unoriented film. In this instance, the polyester polymer of the first layer (A) was dried and melt extruded at a polymer temperature of about 280° C. The second layer (B) was also melt extruded at a polymer temperature of about 290° C. using an extruder. A laminate film polymer melt extruded from the double-layer die was cooled and taken up on a casting roller to obtain an unoriented film. The unoriented film was then drawn in a longitudinal direction at a draw ratio and at a temperature shown in Table 19 and then drawn in a transverse direction at a draw ratio and at a temperature shown in Table 19, and heat set at a temperature shown in Table 19 to produce a biaxially oriented laminate film.

TABLE 18

|  | Poly-carbonate (% by weight) | Poly-ester (% by weight) | Polyethylene terephtha-late (% by weight) | Polybutylene terephtha-late (% by weight) | Phosphorus-based stabilzer (ppm) |
|---|---|---|---|---|---|
| Comp. Ex. 24 | 18 | 82 | 40 | 60 | 60 |
| Ex. 76 | 22 | 78 | 40 | 60 | 60 |
| Ex. 77 | 40 | 60 | 40 | 60 | 50 |
| Comp. Ex. 25 | 62 | 38 | 40 | 60 | 40 |
| Comp. Ex. 26 | 40 | 60 | 8 | 92 | 80 |
| Ex. 78 | 40 | 60 | 12 | 88 | 80 |
| Ex. 79 | 40 | 60 | 20 | 80 | 60 |
| Ex. 80 | 40 | 60 | 60 | 40 | 40 |
| Ex. 81 | 40 | 60 | 80 | 20 | 20 |
| Ex. 82 | 40 | 60 | 88 | 12 | 20 |
| Comp. Ex. 27 | 40 | 60 | 92 | 8 | 20 |
| Ex. 83 | 40 | 60 | 40 | 60 | 50 |
| Ex. 84 | 40 | 60 | 40 | 60 | 50 |

Comp. Ex.: Comparative Example
Ex.: Example

The thus obtained biaxially oriented film had a plane orientation coefficient of 0.06 for the first layer (A) and 0.05 for the second layer (B), and a thickness of 6 μm for the first layer (A) and 24 μm for the second layer (B). The heat shrinkage at 150° C. of the film was 5 to 7%.

TABLE 19

|  | Longitudinal drawing temperature (°C.) | Longitu-dinal draw ratio | Transvers drawing temperature (°C.) | Trans-verse draw ratio | Heat setting temperature (°C.) |
|---|---|---|---|---|---|
| Comp. Ex. 24 | 120 | 2.9 | 140 | 3.0 | 180 |
| Ex. 76 | 120 | 2.9 | 140 | 3.0 | 180 |
| Ex. 77 | 120 | 2.9 | 140 | 3.0 | 180 |
| Comp. Ex. 25 | 120 | 2.9 | 140 | 3.0 | 180 |
| Comp. Ex. 26 | 120 | 2.9 | 140 | 3.0 | 180 |
| Ex. 78 | 120 | 2.9 | 140 | 3.0 | 180 |
| Ex. 79 | 120 | 2.9 | 140 | 3.0 | 180 |
| Ex. 80 | 120 | 2.9 | 140 | 3.0 | 180 |
| Ex. 81 | 120 | 2.9 | 140 | 3.0 | 180 |
| Ex. 82 | 120 | 2.9 | 140 | 3.0 | 180 |
| Comp. Ex. 27 | 120 | 2.9 | 140 | 3.0 | 180 |

TABLE 19-continued

|  | Longitudinal drawing temperature (°C.) | Longitudinal draw ratio | Transverse drawing temperature (°C.) | Transverse draw ratio | Heat setting temperature (°C.) |
|---|---|---|---|---|---|
| Ex. 83 | 120 | 2.5 | 135 | 3.4 | 180 |
| Ex. 84 | 120 | 3.2 | 140 | 2.8 | 180 |

Comp. Ex.: Comparative Example
Ex.: Example

The evaluation results are shown in Table 20. The biaxially oriented laminate films of the present invention were excellent in extrusion moldability, drawability, adhesion to a metal plate, impact resistance at low temperatures and flavor retaining property.

TABLE 20

|  | (EM + ET)/2 | EM − ET | Extrusion moldability | Continuous film properties | Peel strength (kg/cm) | Impact resistance at low temperatures (mA) | Flavor retaining property |
|---|---|---|---|---|---|---|---|
| Comp. Ex. 24 | 230 | −20 | ○ | ◎ | 7.0 | 0.6 | ○ |
| Ex. 76 | 230 | 20 | ◎ | ◎ | 6.0 | 0.2 | ○ |
| Ex. 77 | 210 | 100 | ○ | ◎ | 3.0 | 0.1 | ○ |
| Comp. Ex. 25 | 160 | 120 | X | X | — | — | — |
| Comp. Ex. 26 | 250 | 140 | Δ | ○ | 2.0 | 0.5 | ○ |
| Ex. 78 | 250 | 120 | ○ | ◎ | 2.5 | 0.1 | ○ |
| Ex. 79 | 245 | 130 | ○ | ◎ | 3.0 | 0.1 | ○ |
| Ex. 80 | 180 | 80 | ◎ | ○ | 3.5 | 0.1 | ○ |
| Ex. 81 | 160 | 80 | ◎ | ○ | 3.0 | 0.1 | ○ |
| Ex. 82 | 160 | 60 | ○ | ○ | 3.0 | 0.1 | ○ |
| Comp. Ex. 27 | 155 | 30 | X | X | — | — | — |
| Ex. 83 | 1.70 | 240 | ○ | ○ | 3.0 | 0.2 | ○ |
| Ex. 84 | 160 | −40 | ○ | ○ | 3.0 | 0.1 | ○ |

Comp. Ex.: Comparative Example
Ex.: Example

EXAMPLES 85 TO 92 AND COMPARATIVE EXAMPLES 28 AND 29

The same polycarbonate and the same polyethylene terephthalate for the first layer (A) as used in the Examples 1 to 8 and Comparative Examples 1 to 4 were used. ADK STAB PEP-8 was used as a phosphorus-based stabilizer for the polycarbonate.

40% by weight of this polycarbonate and 60% by weight of a polyester comprising a polyethylene terephthalate-based polyester (40% by weight) and a polybutylene terephthalate-based polyester (60% by weight) shown in Table 21 were dry blended.

The polyethylene terephthalate-based polyester and the polybutylene terephthalate-based polyester were both obtained by a solid-phase polymerization method. In the former a germanium dioxide catalyst was used, while in the latter a tetrabutyl titanate catalyst was used, the intrinsic viscosity of a prepolymer and a solid-phase polymerization time in the solid-phase polymerization were changed, and the terminal carboxyl group concentration was changed as shown in Table 21.

TABLE 21

|  | Kind | Intrinsic viscosity | Melting point (°C.) | Glass transition temperature (°C.) | Terminal carboxyl group concentration (eq./10⁶ g) |
|---|---|---|---|---|---|
| \multicolumn{6}{c}{PET-based polyester} |
| Comp. Ex. 28 | PETI12 | 0.75 | 229 | 74 | 4 |
| Ex. 85 | PETI12 | 0.75 | 229 | 74 | 12 |
| Ex. 86 | PETI12 | 0.75 | 229 | 74 | 20 |
| Ex. 87 | PETI12 | 0.75 | 229 | 74 | 30 |
| Ex. 88 | PETI12 | 0.75 | 229 | 74 | 30 |
| Ex. 89 | PETI12 | 0.75 | 229 | 74 | 30 |
| Comp. Ex. 29 | PETI12 | 0.75 | 229 | 74 | 30 |
| Ex. 90 | PETI12 | 0.75 | 225 | 78 | 25 |
| Ex. 91 | PETI12 | 0.75 | 225 | 78 | 12 |
| Ex. 92 | PETI12 | 0.75 | 225 | 78 | 30 |
| \multicolumn{6}{c}{PBT-based polyester} |
| Comp. Ex. 28 | PBTI5 | 0.9 | 218 | 28 | 8 |
| Ex. 85 | PBTI5 | 0.9 | 218 | 28 | 8 |
| Ex. 86 | PBTI5 | 0.9 | 218 | 28 | 8 |
| Ex. 87 | PBTI5 | 0.9 | 218 | 28 | 8 |

TABLE 21-continued

| | Kind | Intrinsic viscosity | Melting point (°C.) | Glass transition temperature (°C.) | Terminal carboxyl group concentration (eq./10⁶ g) |
|---|---|---|---|---|---|
| Ex. 88 | PBTI5 | 0.9 | 218 | 28 | 12 |
| Ex. 89 | PBTI5 | 0.9 | 218 | 28 | 20 |
| Comp. Ex. 29 | PBTI5 | 0.9 | 218 | 28 | 22 |
| Ex. 90 | PBT | 0.9 | 223 | 32 | 10 |
| Ex. 91 | PBT | 0.9 | 223 | 32 | 18 |
| Ex. 92 | PBTI5 | 0.9 | 223 | 28 | 8 |

Comp. Ex.: Comparative Example
Ex.: Example
PET: Polyethylene terephthalate
PBT: Polybutylene terephthalate
PETI12: PET copolymerized with 12 mol % of isophthalic acid
PBTI5: PBT copolymerized with 5 mol % of isophthalic acid Biaxially oriented laminate films were obtained in the same manner as in Examples 1 to 8 and Comparative Examples 1 to 4. Drawing in a traverse direction was carried out at 140° C. The evaluation results are shown in Table 22.

TABLE 22

| | Extrusion moldability | Draw-ability | Peel strength (kg/cm) | Impact at low-temperatures (mA) | Flavor retaining property |
|---|---|---|---|---|---|
| Comp. Ex. 28 | Δ | X | — | — | — |
| Ex. 85 | ○ | ○ | 2.5 | 0.1 | ○ |
| Ex. 86 | ⊚ | ⊚ | 2.5 | 0.1 | ○ |
| Ex. 87 | ⊚ | ⊚ | 3.0 | 0.1 | ⊚ |
| Ex. 88 | ⊚ | ⊚ | 3.0 | 0.1 | ⊚ |
| Ex. 89 | ○ | ○ | 3.5 | 0.1 | ○ |
| Comp. Ex. 29 | X | X | — | — | — |
| Ex. 90 | ⊚ | ⊚ | 2.0 | 0.2 | ○ |
| Ex. 91 | ○ | ○ | 2.0 | 0.1 | ○ |
| Ex. 92 | ⊚ | ⊚ | 3.0 | 0.1 | ○ |

Comp. Ex.: Comparative Example
Ex.: Example

EXAMPLES 93 TO 98 AND COMPARATIVE EXAMPLES 30 TO 33

The peak temperatures of low-temperature crystallization (Tcc1 and Tcc4), extrusion moldability and drawability of the biaxially oriented laminate films of Examples 69 to 75 and Comparative Examples 20 to 23 are shown in Table 23.

TABLE 23

| | Tcc1 °C. | Tcc4 °C. | Tcc4–Tcc1 °C. | Extrusion moldability | Drawability |
|---|---|---|---|---|---|
| Comp. Ex. 30 | 95 | 132 | 37 | ○ | ⊚ |
| Ex. 93 | 95 | 134 | 39 | ○ | ⊚ |
| Ex. 94 | 92 | 137 | 45 | ○ | ○ |
| Comp. Ex. 31 | 91 | 138 | 47 | X | X |
| Comp. Ex. 32 | 60 | 104 | 44 | Δ | ○ |
| Ex. 95 | 66 | 108 | 42 | | |
| Ex. 96 | 75 | 110 | 35 | ○ | ○ |
| Ex. 97 | 115 | 145 | 30 | ⊚ | ○ |
| Ex. 98 | 152 | 170 | 18 | ⊚ | ○ |

TABLE 23-continued

| | Tcc1 °C. | Tcc4 °C. | Tcc4–Tcc1 °C. | Extrusion moldability | Drawability |
|---|---|---|---|---|---|
| Ex. 99 | 156 | 172 | 16 | ○ | ○ |
| Comp. Ex. 33 | 157 | 170 | 13 | X | X |

Comp. Ex.: Comparative Example
Ex.: Example

EXAMPLES 100 TO 107 AND COMPARATIVE EXAMPLES 34 TO 37

The center line surface roughness (Ra) of the second layer (B) of each of the biaxially oriented laminate films of Examples 1 to 8 and Comparative Examples 1 to 4 are shown in Table 24.

TABLE 24

| | Ra (nm) |
|---|---|
| Comp. Ex. 34 | 23 |
| Ex. 100 | 25 |
| Ex. 101 | 27 |
| Comp. Ex. 35 | — |
| Comp. Ex. 36 | 13 |
| Ex. 102 | 15 |
| Ex. 103 | 17 |
| Ex. 104 | 20 |
| Ex. 105 | 37 |
| Ex. 106 | 54 |
| Ex. 107 | 110 |
| Comp. Ex. 37 | — |

Comp. Ex.: Comparative Example
Ex.: Example

What is claimed is:

1. A biaxially oriented film to be laminated on a metal, which is a laminate film comprising:

(A) a first layer of a polyester comprising ethylene terephthalate as a main recurring unit; and (B) a second layer formed from a composition of polyesters and a polycarbonate which consists essentially of a recurring unit represented by the following formula (1):

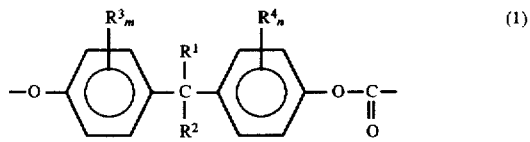

(1)

wherein $R^1$ and $R^2$ are independent from each other and selected from the group consisting of a hydrogen atom, an alkyl group having 1 to 5 carbon atoms and a cycloalkyl group having 5 to 6 ring carbon atoms, or $R^1$ and $R^2$ may be bonded together to form a cycloalkylene group having 5 to 6 ring carbon atoms with the carbon atom to which they are bonded, $R^3$ and $R^4$ are independent from each other and selected from the group consisting of an alkyl group having 1 to 5 carbon atoms, a phenyl group and a halogen atom, and m and n are independent from each other and are 0, 1 or 2, the polycarbonate and the polyesters being each contained in amounts of 20 to 50% by weight and 50 to 80% by weight, respectively, based on the total thereof; the polyesters consisting essentially of a first polyester comprising ethylene terephthalate as a main recurring unit and having a terminal carboxyl group concentration of more than 5 eq./$10^6$ g and a second polyester comprising butylene terephthalate as a main recurring unit and having a terminal carboxyl group concentration of less than 20 eq./$10^6$ g; and the first and second polyesters being each contained in an amount of 10 to 90% by weight based on the total thereof; and (C) the plane orientation coefficients of said first layer and said second layer are both in the range of 0.05 to 0.10.

2. A biaxially oriented film according to claim 1, wherein the polyester of the first layer comprises ethylene terephthalate in an amount of 80 to 100 mol % of the whole recurring unit.

3. A biaxially oriented film according to claim 1, wherein the polycarbonate of the second layer consists essentially of a recurring unit in which $R^1$ and $R^2$ are a methyl group and m and n are 0 in the formula (1).

4. A biaxially oriented film according to claim 1, wherein the first polyester constituting the polyester of the second layer comprises ethylene terephthalate in an amount of 80 to 100 mol % of the whole recurring unit.

5. A biaxially oriented film according to claim 1, wherein the first polyester constituting the polyester of the second layer has a terminal carboxyl group concentration of 7 to 20 eq./$10^6$ g.

6. A biaxially oriented film according to claim 1, wherein the second polyester constituting the polyester of the second layer comprises butylene terephthalate in an amount of 80 to 100 mol % of the whole recurring unit.

7. A biaxially oriented film according to claim 1, wherein the second polyester constituting the polyester of the second layer has a terminal carboxyl group concentration of 5 to 17 eq./$10^6$ g.

8. A biaxially oriented film according to claim 1, wherein a composition comprising a polycarbonate and a polyester which constitutes the second layer contains 20 to 100 ppm, as phosphorus atoms, of a phosphorus compound.

9. A biaxially oriented film according to claim 1, wherein the temperature of a peak located at the highest temperature is in the range of 100° to 160° C. in the relationship between loss elastic modulus (E") and temperature.

10. A biaxially oriented film according to claim 1, wherein elongation ($E_M$) in a mechanical direction at 100° C. and elongation ($E_T$) in a transverse direction at 100° C. satisfy the following two expressions:

($E_M$+$E_T$)/2>150, and

−50≦$E_M$−$E_T$≦250.

11. A biaxially oriented film according to claim 1, wherein the second layer has a sea/island structure that the polycarbonate is dispersed as an island in the sea of the polyester.

12. A biaxially oriented film according to claim 11, wherein the second layer has islands having an average major diameter of 0.1 to 20 μm on a cut surface prepared by cutting a biaxially oriented film in parallel to the transverse direction and in the thickness direction.

13. A biaxially oriented film according to claim 1, wherein the difference (Tcc4−Tcc1) between the peak temperature (Tcc1) of low-temperature crystallization in a DSC of a sample prepared by melting and quenching a film and the peak temperature (Tcc4) of low-temperature crystallization in a DSC of a sample prepared by further subjecting the sample to the melting and quenching three cycles is in the range of 10° to 60° C.

14. A biaxially oriented film according to claim 1, wherein the center line average surface roughness (Ra) of the first layer is in the range of 5 to 150 nm.

15. A biaxially oriented film according to claim 1 which has a heat shrinkage at 150° C. of 10% or less.

16. A biaxially oriented film according to claim 1 which has a third layer adjacent to the second layer, and the third layer is formed from a polyester comprising ethylene terephthalate as a main recurring unit.

17. A biaxially oriented film according to claim 1 or 16 which has a thickness of 5 to 100 μm.

18. A biaxially oriented film according to claim 1, wherein the thickness ratio of the first layer to the second layer is 1:99 to 50:50.

19. A biaxially oriented film according to claim 16, wherein the thickness of the third layer is 0.5 to 10 μm.

20. A biaxially oriented film to be laminated on a metal, which is a laminate film comprising:

(A) a first layer of a polyester comprising ethylene terephthalate as a main recurring unit; and (B) a second layer formed from a composition of polyesters and a polycarbonate which consists essentially of a recurring unit represented by the following formula (1):

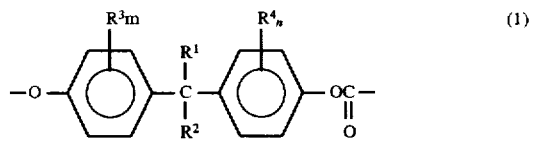

wherein $R^1$ and $R^2$ are independent from each other and selected from the group consisting of a hydrogen atom, alkyl group having 1 to 5 carbon atoms and cycloalkyl group having 5 to 6 ring carbon atoms, or $R^1$ and $R^2$ may be bonded together to form a cycloalkyl group having 5 to 6 ring carbon atoms with a carbon atom bonded thereto, $R^3$ and $R^4$ are independent from each other and selected from the group consisting of an alkyl group having 1 to 5 carbon atoms, phenyl group and halogen atom, and m and n are independent from each other and 0, 1 or 2, the polycarbonate and the polyesters being each contained in amounts of 20 to 50% by weight and 50 to 80% by weight based on the total thereof; the polyesters consisting essentially of a first polyester comprising ethylene terephthalate as a main recurring unit and a second polyester comprising butylene terephthalate as a main recurring unit; the first and second polyesters being contained in an amount of 10 to 90% by weight based on the total thereof; the polycarbonate being dispersed as an island in the sea of the polyester; and the island appearing as an independent phase having an average major diameter of 0.1 to 20 μm on a cut surface prepared by cutting the biaxially oriented film in parallel to the transverse direction and in the thickness direction; and in which (C) the plane orientation coefficients of the first layer and second layer are both in the range of 0.05 to 0.10.

* * * * *